US009281731B2

(12) United States Patent
Benedict

(10) Patent No.: US 9,281,731 B2
(45) Date of Patent: Mar. 8, 2016

(54) METHOD FOR MAINTAINING A MACHINE HAVING A ROTOR AND A STATOR

(75) Inventor: Eric L. Benedict, Middlesex, VT (US)

(73) Assignee: Northern Power Systems, Inc., Barre, VT (US)

( * ) Notice: Subject to any disclaimer, the term of this patent is extended or adjusted under 35 U.S.C. 154(b) by 782 days.

(21) Appl. No.: 13/240,779

(22) Filed: Sep. 22, 2011

(65) Prior Publication Data

US 2012/0073117 A1     Mar. 29, 2012

Related U.S. Application Data

(60) Provisional application No. 61/385,703, filed on Sep. 23, 2010.

(51) Int. Cl.
*H02K 15/00* (2006.01)
*F03D 1/00* (2006.01)
(Continued)

(52) U.S. Cl.
CPC ............ *H02K 15/0006* (2013.01); *F03D 1/003* (2013.01); *F03D 9/002* (2013.01); *H02K 7/1838* (2013.01); *F05B 2220/7066* (2013.01); *H02K 15/022* (2013.01); *H02K 15/03* (2013.01);
(Continued)

(58) Field of Classification Search
CPC ..... F03D 1/003; F03D 1/001; F03D 11/0016; H02K 15/0006; H02K 2213/12
USPC .......................................................... 29/596
See application file for complete search history.

(56) References Cited

U.S. PATENT DOCUMENTS

| 2,078,668 A | 4/1937 | Kilgore |
| 3,708,707 A | 1/1973 | Kranz |

(Continued)

FOREIGN PATENT DOCUMENTS

| CH | 75705 | 9/1917 |
| CN | 1881758 | 6/2010 |

(Continued)

OTHER PUBLICATIONS

"Cogging Torque Minimization Technique for Multiple-Rotor, Axial-Flux, Surface-Mounted-PM Motors: Alternating Magnet Pole-Arcs in Facing Rotors," by Metin Aydin, Ronghai Qu, and Thomas A. Lipo, Industry Applications Conference, 38th IAS Annual Meeting, Oct. 12-16, 2003.

(Continued)

*Primary Examiner* — Livius R Cazan
(74) *Attorney, Agent, or Firm* — Downs Rachlin Martin PLLC

(57) ABSTRACT

Methods of precisely positioning a rotor of a machine into one or more service positions for the purpose of servicing the machine. In some embodiments, the machine includes A rotor and a stator segmented into multiple removable stator modules. During servicing, a stator-module replacement tool is precisely located in any one or more of multiple service positions corresponding to the multiple stator modules by selectively energizing the machine. In other embodiments, the machine includes a stator and a rotor having multiple removable permanent magnets corresponding respectively to multiple service positions. During servicing, the rotor is precisely located in any one or more of multiple service positions corresponding to the permanent magnets by selectively energizing the machine. A servicing control system is disclosed for controlling the excitation of a machine stator in a manner that effects precise positioning of the rotor into a selected service position.

19 Claims, 12 Drawing Sheets

(51) Int. Cl.
*F03D 11/00* (2006.01)
*F03D 9/00* (2006.01)
*H02K 7/18* (2006.01)
*H02K 15/02* (2006.01)
*H02K 15/03* (2006.01)

(52) U.S. Cl.
CPC ............ *H02K2213/12* (2013.01); *Y02E 10/725* (2013.01); *Y10T 29/49009* (2015.01); *Y10T 29/53143* (2015.01)

(56) References Cited

U.S. PATENT DOCUMENTS

| | | |
|---|---|---|
| 4,315,171 A | 2/1982 | Schaeffer |
| 4,424,463 A | 1/1984 | Musil |
| 4,769,567 A | 9/1988 | Kurauchi et al. |
| 4,990,809 A | 2/1991 | Artus et al. |
| 5,196,751 A | 3/1993 | Spirk |
| 5,675,196 A | 10/1997 | Huang et al. |
| 5,691,589 A | 11/1997 | Keim et al. |
| 5,844,341 A | 12/1998 | Spooner et al. |
| 6,093,984 A | 7/2000 | Shiga et al. |
| 6,265,804 B1 | 7/2001 | Nitta et al. |
| 6,321,439 B1 | 11/2001 | Berrong et al. |
| 6,717,323 B1 | 4/2004 | Soghomonian et al. |
| 6,777,850 B2 | 8/2004 | Harada et al. |
| 6,781,276 B1 | 8/2004 | Stiesdal et al. |
| 6,819,016 B2 | 11/2004 | Houle et al. |
| 6,844,656 B1 | 1/2005 | Larsen et al. |
| 6,891,298 B2 | 5/2005 | Gary |
| 6,975,051 B2 | 12/2005 | Groening et al. |
| 7,113,899 B2 | 9/2006 | Shah et al. |
| 7,183,689 B2 | 2/2007 | Schmidt et al. |
| 7,740,107 B2 * | 6/2010 | Lemburg et al. ............... 182/142 |
| 7,808,136 B2 | 10/2010 | Knauff |
| 8,061,999 B2 * | 11/2011 | Bagepalli et al. ......... 416/244 R |
| 8,083,212 B2 | 12/2011 | Numajiri et al. |
| 8,664,819 B2 * | 3/2014 | Piercey et al. ............ 310/156.12 |
| 8,789,274 B2 | 7/2014 | Bywaters et al. |
| 8,816,546 B2 | 8/2014 | Bywaters et al. |
| 8,912,704 B2 | 12/2014 | Petter et al. |
| 2002/0074887 A1 | 6/2002 | Takano et al. |
| 2002/0163272 A1 | 11/2002 | Larsson et al. |
| 2006/0131985 A1 | 6/2006 | Qu et al. |
| 2006/0279160 A1 | 12/2006 | Yoshinaga et al. |
| 2008/0115347 A1 | 5/2008 | Majernik et al. |
| 2008/0197742 A1 | 8/2008 | Vollmer |
| 2008/0309189 A1 | 12/2008 | Pabst et al. |
| 2009/0026858 A1 | 1/2009 | Knauff |
| 2009/0091210 A1 | 4/2009 | Bade et al. |
| 2009/0129931 A1 | 5/2009 | Stiesdal |
| 2009/0172934 A1 | 7/2009 | Mall et al. |
| 2009/0261668 A1 | 10/2009 | Mantere |
| 2011/0309712 A1 | 12/2011 | Chin |
| 2012/0073118 A1 | 3/2012 | Bywaters et al. |
| 2012/0074797 A1 | 3/2012 | Petter et al. |

FOREIGN PATENT DOCUMENTS

| | | |
|---|---|---|
| DE | 3546226 A1 | 7/1986 |
| DE | 19604643 A1 | 8/1997 |
| DE | 19905748 A1 | 8/1999 |
| DE | 19920309 A1 | 11/1999 |
| DE | 10027246 C1 | 10/2001 |
| DE | 102008063783 A1 | 6/2010 |
| EP | 938181 A1 | 8/1999 |
| EP | 1422806 A2 | 5/2004 |
| EP | 1458080 A1 | 9/2004 |
| EP | 1519040 A1 | 3/2005 |
| EP | 1988282 A2 | 11/2008 |
| EP | 2072814 A2 * | 6/2009 |
| EP | 2131475 A2 | 12/2009 |
| EP | 2163528 A1 | 3/2010 |
| EP | 2182570 A1 | 5/2010 |
| EP | 2187506 A1 | 5/2010 |
| EP | 2226502 A1 | 9/2010 |
| EP | 2320080 A1 | 5/2011 |
| ES | 2233146 A1 | 6/2005 |
| JP | 53051407 A | 5/1978 |
| JP | 1231645 A | 9/1989 |
| JP | 4289759 A | 10/1992 |
| JP | 11335074 A | 12/1999 |
| JP | 2004289919 A | 10/2004 |
| JP | 2005210790 A | 8/2005 |
| JP | 2009131030 A | 6/2009 |
| WO | 0060719 A1 | 10/2000 |
| WO | 0121956 A1 | 3/2001 |
| WO | 2004017497 A1 | 2/2004 |
| WO | 2005031159 A1 | 4/2005 |
| WO | 2006032969 A2 | 3/2006 |
| WO | 2006045772 A1 | 5/2006 |
| WO | 2008014584 A1 | 2/2008 |
| WO | 2008021401 A2 | 2/2008 |
| WO | 2008069818 A1 | 6/2008 |
| WO | 2009112887 A1 | 9/2009 |
| WO | 2010024510 A1 | 3/2010 |
| WO | 2010037392 A2 | 4/2010 |
| WO | 2011031165 A1 | 3/2011 |
| WO | PCT/US2011/052885 | 1/2012 |
| WO | PCT/US2011/052879 | 3/2012 |
| WO | PCT/US2011/052882 | 3/2012 |
| WO | PCT/US2011/052893 | 9/2012 |

OTHER PUBLICATIONS

"Nature and Measurements of Torque Ripple of Permanent-Magnet Adjustable-Speed Motors," by John S. Hsu, Brian P. Scoggins, Matthew B. Scudiere, et al., Industry Applications Convference, 1995, 30th IAS Annual Meeting, Oct. 8-12, 1995.
"Design Techniques for Reducing the Cogging Torque in Surface-Mounted PM Motors," by Bianchi, N. et al., IEEE Transactions on Industry Applications, Sep./Oct. 2002, 1259-1265, vol. 38, No. 5.
Oxford English Dictionary, Definition of "integra," Mar. 17, 2013.
U.S. Appl. No. 13/240,768, Mar. 15, 2013, Office Action.
U.S. Appl. No. 13/240,731, May 30, 2013, Office Action.
U.S. Appl. No. 13/240,756, filed Sep. 22, 2011.
U.S. Appl. No. 13/240,768, filed Sep. 22, 2011.
U.S. Appl. No. 13/240,731, filed Sep. 22, 2011.
U.S. Appl. No. 13/240,788, filed Sep. 22, 2011.
PCT International Search Report dated Feb. 20, 2012 for related PCT/US2011/052883 entitled "Method and System for Maintaining a Machine Having a Rotor and a Stator," Benedict, Eric.
U.S. Appl. No. 13/240,768, Jun. 25, 2013, Response to Office Action.
U.S. Appl. No. 13/240,768, Aug. 6, 2013, Final Office Action.
U.S. Appl. No. 13/240,731, Apr. 9, 2013, Restriction Requirement.
U.S. Appl. No. 13/240,731, May 9, 2013, Response to Restriction Requirement.
Response to Final Office Action dated Oct. 25, 2013, in related U.S. Appl. No. 13/240,768, filed Sep. 22, 2011.
RCE dated Oct. 25, 2013, in related U.S. Appl. No. 13/240,768, filed Sep. 22, 2011.
Amendment and Response to Office Action dated Sep. 30, 2013, in related U.S. Appl. No. 13/240,731, filed Sep. 22, 2011.
Notice of Allowance dated Apr. 25, 2014, in related U.S. Appl. No. 13/240,768, filed Sep. 22, 2011.
Response to Office Action dated May 14, 2014, in related U.S. Appl. No. 13/240,731, filed Sep. 22, 2011.
Restriction Requirement dated Mar. 13, 2014, in related U.S. Appl. No. 13/240,788, filed Sep. 22, 2011.
Response to Office Action dated Mar. 19, 2014, in related U.S. Appl. No. 13/240,756, filed Sep. 22, 2011.
Notice of Allowance dated Mar. 28, 2014, in related U.S. Appl. No. 13/240,756, filed Sep. 22, 2011.
Office Action dated Dec. 19, 2013, in related U.S. Appl. No. 13/240,756, filed Sep. 22, 2011.
First Examination Report dated Jun. 12, 2014, in related EU Patent Application No. 11773580.3 entitled "Electromagnetic Rotary Machines Having Modular Active-Coil Portions and Modules for Such Machines.".

(56) References Cited

OTHER PUBLICATIONS

Notice of Allowance dated Aug. 6, 2014, in related U.S. Appl. No. 13/240,731, filed Sep. 22, 2011.
Response to Office Action dated Oct. 1, 2014, in related U.S. Appl. No. 13/240,788, filed Sep. 22, 2011, titled "Module-Handling Tool for Installing/Removing Modules Into/From an Electromagnetic Rotary Machine Having a Modularized Active Portion.".
Response to Restriction Requirement dated Jul. 14, 2014, in related U.S. Appl. No. 13/240,788, filed Sep. 22, 2011.
Office Action dated Jul. 29, 2014, in related U.S. Appl. No. 13/240,788, filed Sep. 22, 2011.
Response to Final Office Action dated Apr. 27, 2015, in related U.S. Appl. No. 13/240,788, filed Sep. 22, 2011, titled "Module-Handling Tool for Installing/Removing Modules Into/From an Electromagnetic Rotary Machine.".
Final Office Action dated Jan. 27, 2015, in related U.S. Appl. No. 13/240,788, filed Sep. 22, 2011.
Related U.S. Appl. No. 14/511,143, Design Process for Low Cogging Torque and Low Torque Ripple Permanent Magnet Machine Rotor and Permanent Magnet Machine Designed Thereby, filed Oct. 9, 2014.
Related U.S. Appl. No. 14/566,193, Sectionalized Electromechanical Machines Having Low Torque Ripple and Log Cogging Torque Characteristics, filed Dec. 10, 2014.
Office Action dated Jul. 17, 2015, in related U.S. Appl. No. 13/240,788, filed Sep. 22, 2011, titled "Module-Handling Tool for Installing/Removing Modules Into/From an Electromagnetic Rotary Machine.".

* cited by examiner

METHOD FOR MAINTAINING A MACHINE
HAVING A ROTOR AND A STATOR

RELATED APPLICATION DATA

This application claims the benefit of priority of U.S. Provisional Patent Application Ser. No. 61/385,703, filed on Sep. 23, 2010, and titled "Method and System for Maintaining a Machine Having a Rotor and a Stator," which is incorporated by reference herein in its entirety.

FIELD OF THE INVENTION

The present invention generally relates to the field of electrical machinery. In particular, the present invention is directed to a method and system for maintaining a machine having a rotor and a stator.

BACKGROUND

Stators and rotors of certain large machines (e.g., machines having a rotor diameter of 2 m or more) are often modularized to aid in their manufacture. As with any industrial equipment, stators and rotors require periodic maintenance and servicing over their lifetimes that can include replacing one or more of the modules. For example, dielectric breakdown in a particular stator winding will require that the corresponding stator module be replaced. This periodic maintenance can be difficult and expensive due to the sheer size and weight of the modules, especially for large machines.

The expense of maintaining and repairing such machines having modularized construction is compounded for electrical power generators used in wind power units (WPUs) that convert wind energy into electricity. These generators are typically supported at the tops of tall towers not only to provide clearance for the turbine blades, but also to locate the wind turbines high off the ground, water or other surface where wind speeds are characteristically higher. Because of this location, maintaining and servicing generators in WPUs can be more expensive, inconvenient, and dangerous than servicing a conventional generator. The expense and challenge are often further increased in the case of WPUs located in remote areas or on difficult terrain, such as hilltops, mountain ridgelines, or at sea.

SUMMARY OF THE DISCLOSURE

In one implementation, the present disclosure is directed to a method of servicing a machine having a stator and a rotor that includes a rotational axis. The method includes providing a service device operatively configured for servicing the machine, wherein the rotor of the machine has a service position associated with the service device; energizing the machine so as to position and maintain the rotor in the service position about the rotational axis; and when the rotor is in the service position as a result of the energizing, servicing the machine using the service device.

In another implementation, the present disclosure is directed to a system. The system includes a machine that includes a rotor and a stator having a plurality of windings spaced circumferentially from one another, wherein the rotor has a rotational service position associated with a service tool used to service the machine; and a servicing control system in communication with the machine, the servicing control system responsive to a rotor position request and configured to selectively energize one or more of the plurality of stator windings so as to position and maintain the rotor in the rotational service position in response to the rotor position request in preparation for servicing the machine with the service tool.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
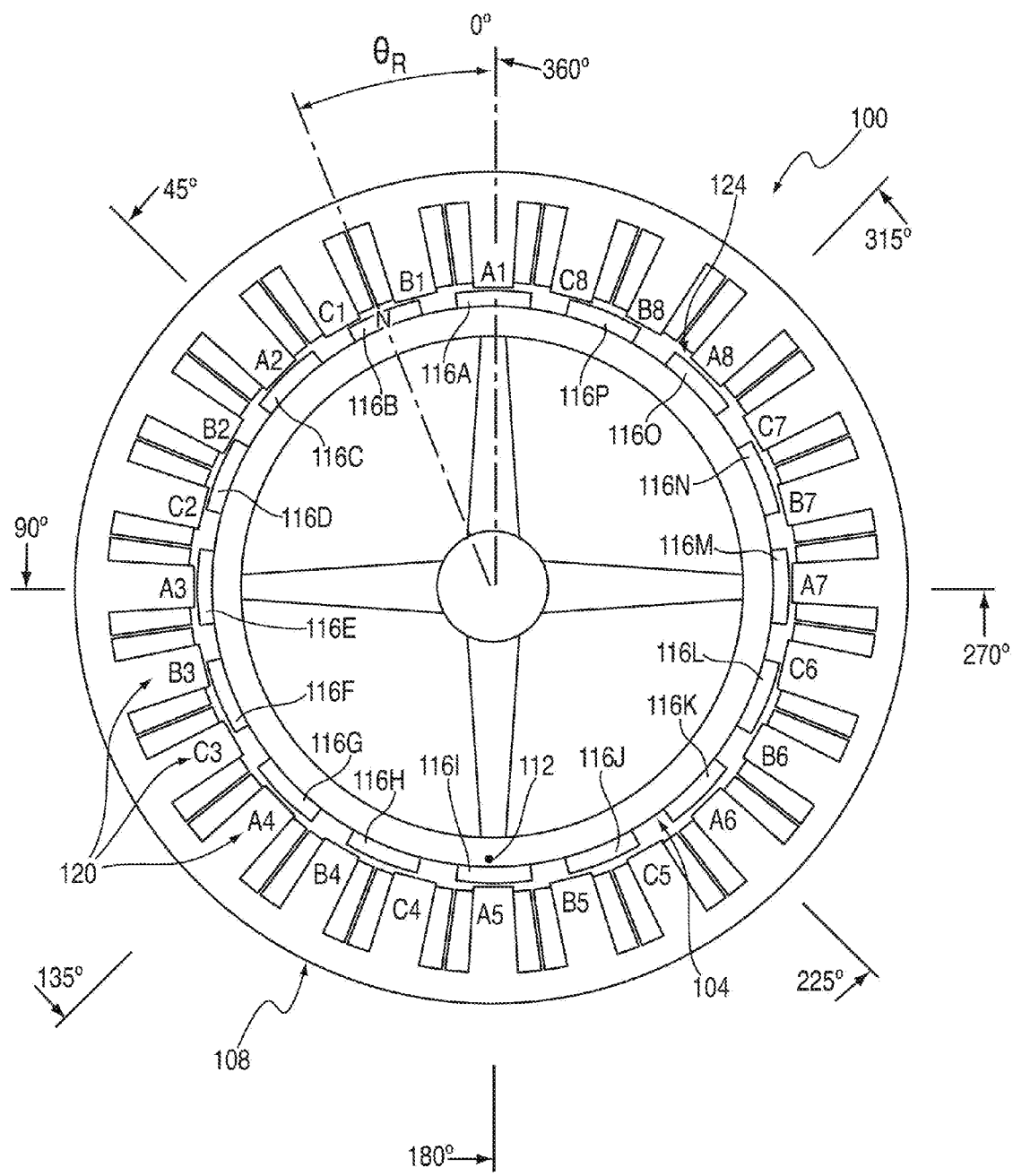
FIG. 1 is a front elevational view of a machine having a rotor and a stator, illustrating a method of precisely positioning the rotor relative to the stator.

Referring now to the drawings, FIG. 1 illustrates a machine 100, which has a rotor 104 and a stator 108 and is useful for describing a technique for precisely positioning a point on the rotor (such as point 112) relative to the stator. In this example, rotor 104 is a permanent magnet (PM) type rotor having sixteen surface-mounted PMs 116A-P, and stator 108 is a wound-core type three-phase stator having twenty-four core-windings 120. A machine having the configuration of rotor 104 and stator 108 shown is commonly known as a "24/16 pole surface PM machine." Rotor 104 and stator 108 are used to illustrate a method of precisely positioning point 112 on the rotor relative to the stator by controlling the excitation of core-windings 120. As those skilled in the art will readily appreciate, rotor 104 and stator 108 may be part of an electrical power generator, for example, an electrical power generator of a wind power unit (WPU), or may be part of an electrical motor, for example, a motor for driving a ship's propeller, azimuth thruster or the like, among many other applications. Those skilled in the art will also appreciate that while rotor 104 is a PM-type rotor and stator 108 is a core-winding-type stator, the rotor and stator may be of any other suitable design.

The precise positioning of a selected point on a rotor, such as point 112 on rotor 104, relative to a corresponding stator is useful in performing maintenance on the stator, rotor and/or other part of the machine of which the stator and rotor are part. For example, and as described below in detail, the rotor can be used to position a service tool at a particular service location for servicing the stator, and the rotor can also be used to position a part or point on the rotor itself to a particular location necessary for servicing of the rotor by a service tool. However, before proceeding to specific examples of implementing precision positioning procedures for servicing one or more parts of a machine, a detailed example of precision positioning techniques are described in the context of rotor 104 and stator 108 of FIG. 1.

For the sake of explanation, core-windings 120 are more particularly designated, respectively, as core-windings A1, B1, C1, A2, B2, C2 . . . A8, B8 and C8. In these core-winding designations, the letters indicate the power phases (i.e., "A," "B," and "C" phases) and the numerals uniquely designate the core-windings within each power phase. Because there are twenty-four core-windings 120 and three power phases are equally used, there are eight A-phase core-windings A1-A8, eight B-phase core-windings B1-B8 and eight C-phase core-windings C1-C8. In the first of the following positioning examples, core-windings A1-A8, B1-B8, C1-C8 are wired to corresponding respective power phases A-C as shown in a wiring configuration 200 of FIG. 2, with all of the phases sharing a common neutral terminal N. While wiring configuration 200 is shown for simplicity, those skilled in the art will understand that there are many other ways to wire core-windings 120 such that the core-windings can be used to precisely position rotor 104 relative to stator 108. Further, those skilled in the art will understand how to implement the disclosed techniques and procedures using any one of those alternative wiring configurations.

Referring to FIG. 1, in machine 100 the locations of PMs 116A-P define the locations of the magnetic poles of rotor 104. In this example, the polarities of PMs 116A-P are arranged so that the direction of the magnetic field in the air gap 124 (i.e., the space between rotor 104 and stator 108) alternates from one PM to the next. Therefore, every other one of PMs 116A-P is oriented so that its north pole is facing air gap 124 and the remaining ones of the PMs have their south poles facing the air gap. Those skilled in the art will readily appreciate that other rotor configurations are possible and that this example can readily be applied to those other cases. Example machine 100 is a three-phase machine (phases A, B, C, as noted above), wherein core-windings 120 are tooth-wound windings defining concentrated stator poles.

In machine 100, a rotor position angle, $\theta_R$, is defined as the angle between the center of a particular north pole on rotor 104 (i.e., the center of one of PMs having its north pole facing air gap 124) and the center of a particular core-winding 120 on stator 108, as shown in FIG. 1. When $\theta_R=0$, a north pole on rotor 104 is aligned with one of A-phase core-windings A1-A8. As $\theta_R$ increases to 45°, rotor 100 completes a full "electrical cycle" or revolution since the rotation of the rotor by $\frac{1}{8}^{th}$ of a mechanical revolution completes a full electrical cycle because a "new" north pole on rotor 104 is now aligned with the next A-phase core winding A1-A8. For an unloaded synchronous machine (PM or wound-field), the rotor flux vector will align with the next stator flux vector in order to be in a minimum torque orientation. When these vectors are aligned, there will be zero torque on rotor 104. If the vectors are out of alignment, then there is a torque generated, which will rotate rotor 104 such that these flux vectors become aligned.

Referring again to FIG. 2, wiring configuration 200 includes terminals 204A, 204B, 204C, with "A," "B" and "C" denoting, respectively, the A, B, and C phases, and terminals 208$A_N$, 208$B_N$, 208$C_N$, which are the neutral connections that are normally connected together. In this first example, this connection is brought out as the neutral terminal N.

The stator flux vector position (electrical angle) is determined by the following complex vectorial summation:

$$\theta_{statorflux} = \text{angle}\left(I_A + I_B e^{j\frac{2\pi}{3}} + I_C e^{-j\frac{2\pi}{3}}\right) \quad \text{Eq. \{1\}}$$

where $I_A$, $I_B$, $I_C$ are the stator phase current magnitudes and angle ( ) is the function that computes the angle of the complex argument. In this example, core-windings 120 are excited with a DC excitation to fix the rotor position angle, $\theta_R$, to be a precisely known value (within an electrical cycle). Realizations of embodiments made in accordance with the present disclosure are envisioned to typically have flux values of phase currents of either 0, ±I or ±I/2; however, depending on the electrical connections and current-control capabilities of a particular machine's excitation, other angles can be obtained. Since a key feature is the precise location of the rotor, such as rotor 104 of FIG. 1, these other angles might be less desirable for use because they will typically introduce additional sources of error in the rotor position angle, $\theta_R$.

Figure 2:
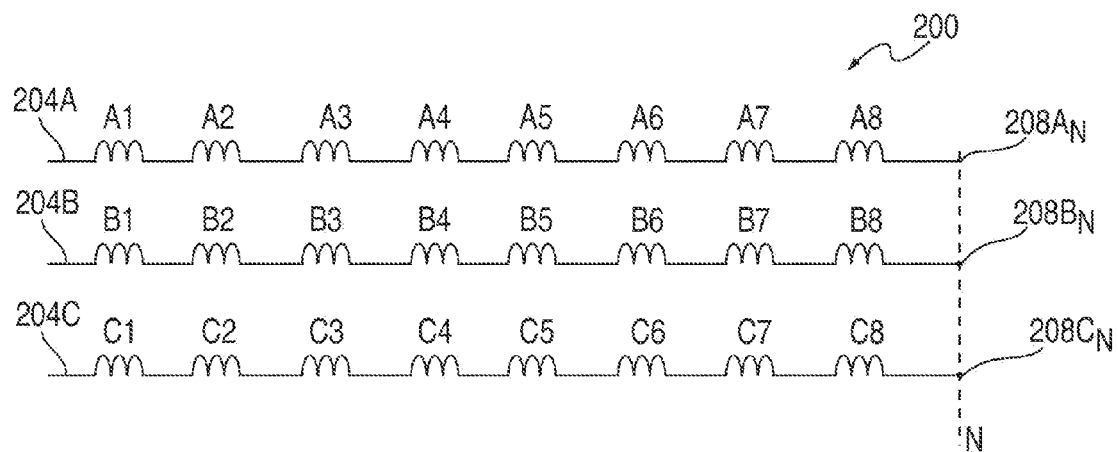
FIG. 2 is a schematic diagram of the electrical connections of the windings of the stator of FIG. 1.

When a neutral terminal is available, such as in the present example with each of terminals 208$A_N$, 208$B_N$, 208$C_N$ being connected to neutral terminal N in FIG. 2, each of phases A-C can be excited independently. Assuming for this example that the phase excitation current is either 0 or ±I, the following Table I shows the possible rotor position angle, $\theta_R$, for the various combinations of phase excitation currents on the three phases A-C.

TABLE I

| Phase A current | Phase B current | Phase C current | $\theta_R$ (deg.) |
|---|---|---|---|
| +I | 0 | 0 | 0 |
| 0 | 0 | −I | 7.5 |
| 0 | +I | 0 | 15 |
| −I | 0 | 0 | 22.5 |
| 0 | 0 | +I | 30 |
| 0 | −I | 0 | 37.5 |

The delta-angle in this example is 7.5° and can be calculated for a general N-phase machine as follows:

$$\Delta\theta_R = \frac{180}{N_{phase} N_{pole}} \quad \text{Eq. \{2\}}$$

When a neutral terminal, for example, neutral terminal N of FIG. 2, is not available to allow a single excitation, then different rotor position angles, $\theta_R$, are available. For example, Table II, below, illustrates this.

TABLE II

| Phase A current | Phase B current | Phase C current | $\theta_R$ (deg.) |
|---|---|---|---|
| +I | −I/2 | −I/2 | 0 |
| +I | 0 | −I | 3.25 |
| +I/2 | +I/2 | −I | 7.5 |
| 0 | +I | −I | 11.25 |
| −I/2 | +I | −I/2 | 15 |
| −I | +I | 0 | 18.75 |
| −I | +I/2 | I/2 | 22.5 |
| −I | 0 | +I | 26.25 |
| −I/2 | −I/2 | +I | 30 |
| 0 | −I | +I | 33.75 |
| I/2 | −I | +I/2 | 37.5 |
| +I | −I | 0 | 41.25 |

Figure 3:
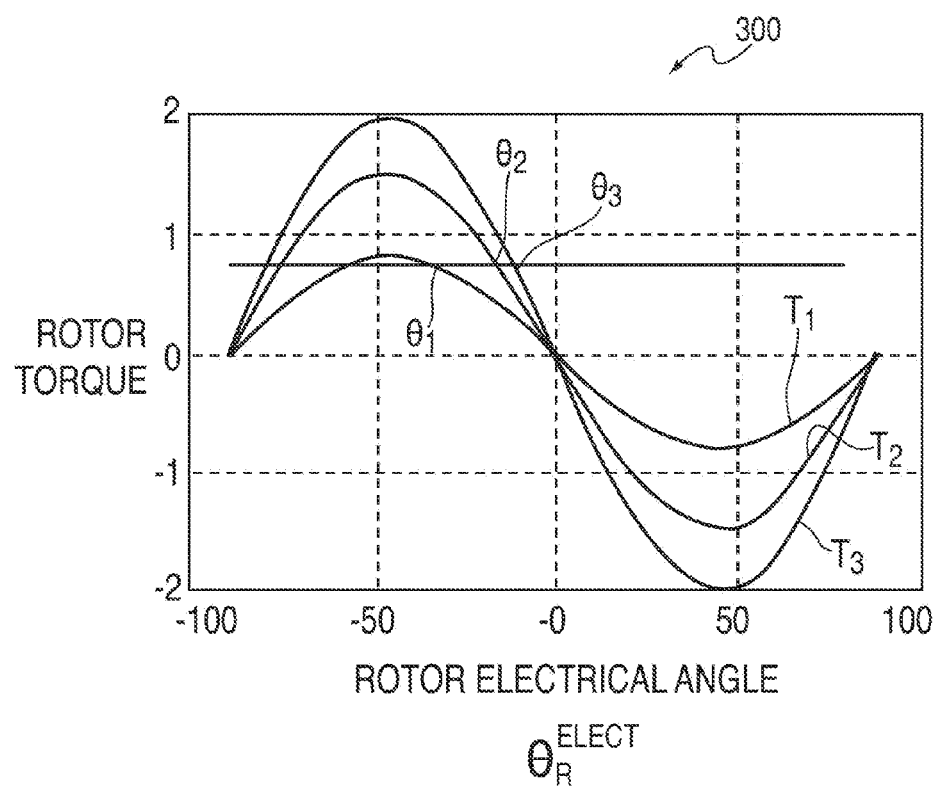
FIG. 3 is a graph of rotor torque versus electrical angle of the rotor for illustrating the effect of a rotor load torque on rotor position.

When there is a load torque on the rotor, such as rotor 104 of FIG. 1, then the resulting position of the rotor will be adjusted from the no-load rotor position angle, $\theta_R$, described above, based on the torque characteristics of the machine and the load torque. This is illustrated with FIG. 3, which shows an exemplary graph 300 of rotor torque versus rotor electrical angle $\theta_R^{Elect}$. In FIG. 3, the rotor electrical angle $\theta_R^{Elect} = N_{poles} \theta_R$. The load torque is represented by the horizontal line $T_{load}$ and the rotor torques for differing increasing currents $I_1$, $I_2$ and $I_3$ are represented by curves $T_1$, $T_2$ and $T_3$, respectively. The intersection of rotor torque curves $T_1$, $T_2$ and $T_3$ with load torque line $T_{load}$ provides rotor angles $\theta_1$, $\theta_2$ and $\theta_3$, respectively. FIG. 3 shows that increasing the stator current will reduce the sensitivity of angular positioning error due to rotor torque. Thus, the typical application will use large currents in order to increase the positioning accuracy to the desired level.

It is noted that FIG. 3 assumes a round rotor (i.e., non-salient-pole) machine for simplicity. Salient-pole machines have a reluctance torque that modifies the torque-angle curve slightly, but the same concepts apply. It is also noted that the foregoing concepts apply to salient-pole machines, PM machines, as well as field-excited synchronous machines (round rotor or salient pole). When extended to wound-field machines, there is an additional variable, i.e., the field current, in setting the curves of FIG. 3. However, for a constant-field excitation, things are the same as in PM machine 100 examined. It is further noted that the foregoing concepts can be directly applied to reluctance machines. When applied to reluctance machines, instead of aligning the rotor and stator flux vectors, the rotor is aligned in order to produce the minimum reluctance path for the generated stator flux.

Figure 4A:
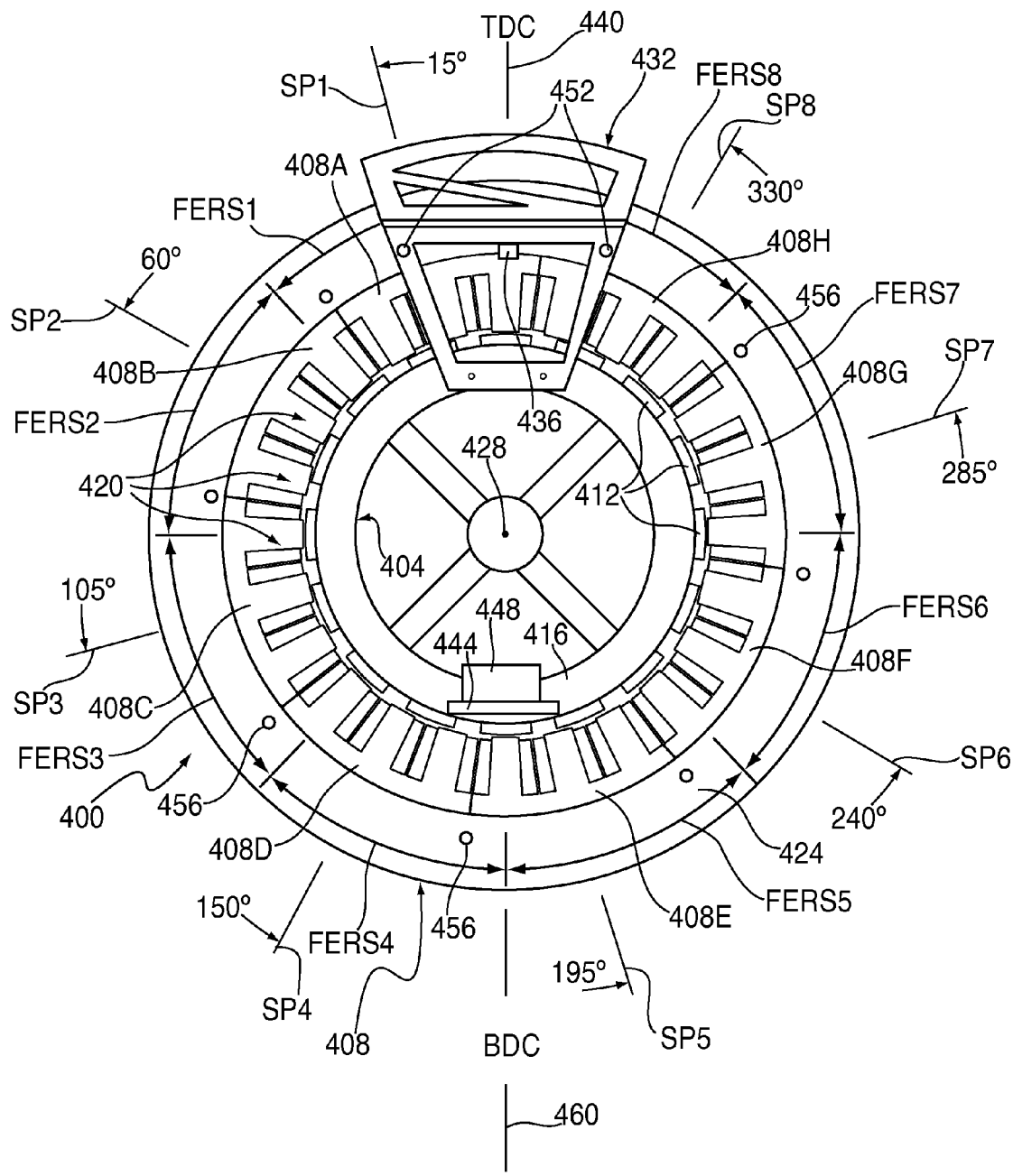
FIG. 4A is a front elevational view of a machine having a modular stator and engaged by a stator module replacement tool, illustrating a method of replacing a module of the stator.
Figure 4B:
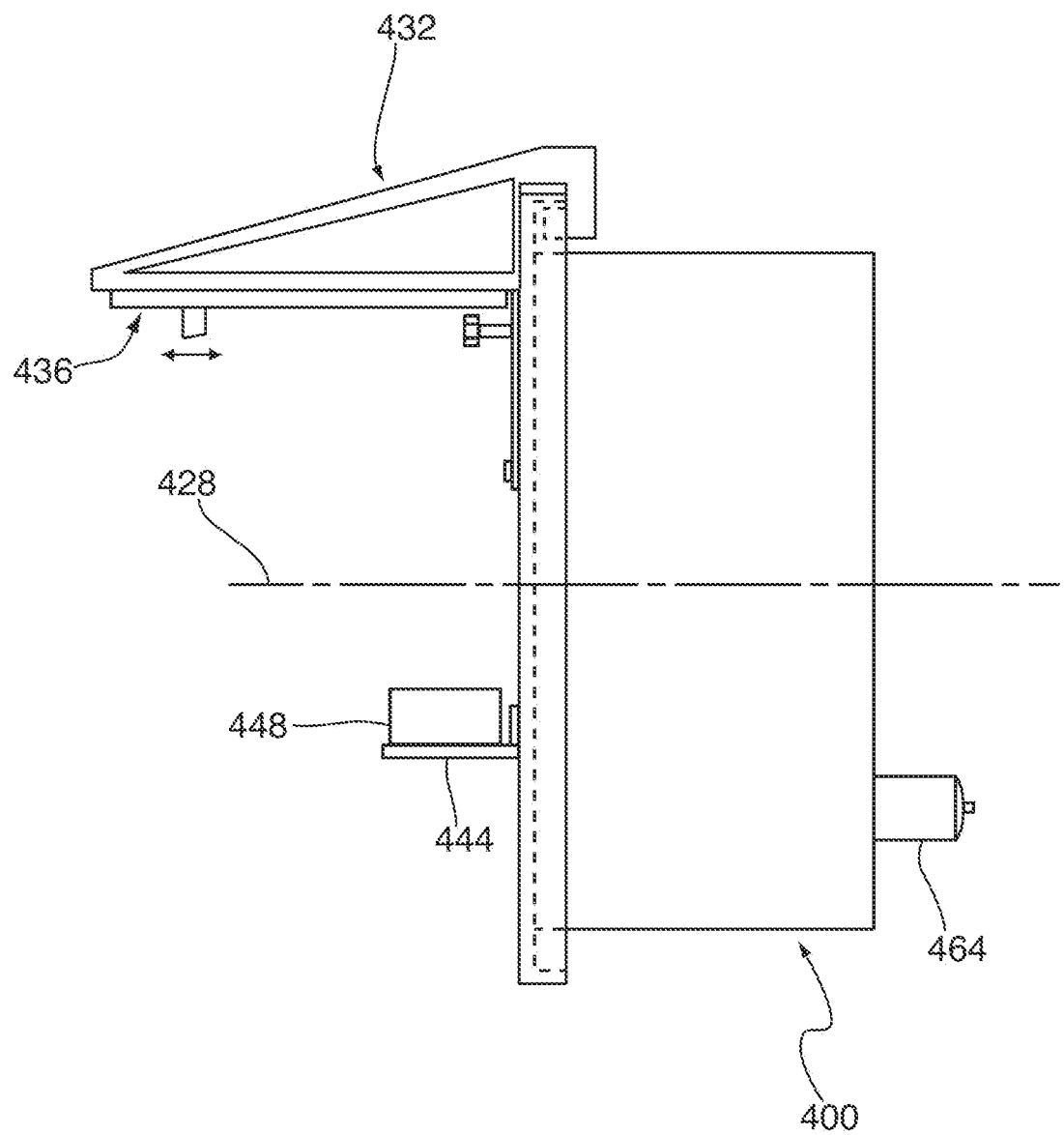
FIG. 4B is a side elevational view of the machine and tool of FIG. 4A.

With the foregoing in mind, following are several examples of situations in which those precision rotor alignment techniques can be used in various methods for servicing a machine in which the techniques are implemented. Referring now to FIGS. 4A-B for a first of these examples, FIGS. 4A-B illustrate a machine 400 having a rotor 404 and a stator 408. For the sake of the simplicity of tying the example of FIGS. 4A-B to FIGS. 1 and 2 and Table I, above, machine 400 of FIGS. 4A-B is likewise a 24/16 pole surface PM machine having the same rotor and stator polarities. Consequently, rotor 404 includes sixteen surface-mounted PMs 412 mounted to a rotor wheel 416, and stator 408 includes twenty-four core-windings 420. In this example, stator 408 is modularized into eight replaceable stator modules 408A-H, each of which is removably secured to a stator frame 424 so as to be movable in a direction parallel to the rotational axis 428 of rotor 404 and is removable using a suitable stator-module replacement tool 432. In this example, stator-module replacement tool 432 is linked to rotor 404, so as to be movable therewith, and movably secured to stator frame 424. Stator-module replacement tool 432 includes an insertion/removal device 436 for pushing any one of stator modules 408A-H into and pulling any one of the stator modules out of stator 408. In this example, insertion/removal device 436 is driven by a suitable automatic actuator (not shown), such as a hydraulic actuator, a motor driven screw actuator, a pneumatic actuator, a rack-and-pinion actuator, etc. However, those skilled in the art will readily appreciate that there are many types of actuators, either automatic or manual, that can be used with insertion/removal device 436.

As mentioned, stator 408 includes eight stator modules 408A-H, with each module having three core-windings 420, specifically one of each of the three phases A-C. Consequently, each stator module 408A-H defines a 45° arc of circular stator 408. Relative to top-dead-center (TDC) 440, the arc-center of stator module 408A is 15° counter-clockwise (CCW) from TDC. This results in the arc-centers of stator modules 408B-H being, respectively, 60°, 105°, 150°, 195°, 240°, 285° and 330° CCW from TDC 440. In this example, in order to insert or remove a particular one of stator modules 408A-H stator-module replacement tool 432 must be centered exactly at the arc-center of that stator module, so that each of the 15°, 60°, 105°, 150°, 195°, 240°, 285° and 330° CCW locations mentioned correspond to service positions SP1-SP8 of stator-module replacement tool 432 for servicing, respectively, stator modules 408A-H.

As will be understood by those skilled in the art, because stator 408 has eight poles as described above, a full 360° mechanical-degree revolution of rotor 404 equates to eight full 360° electrical-degree revolutions of the excitation of stator 408, which are denoted as full electrical revolution segments FERS1-FERS8. As can be seen in FIG. 4A, full electrical revolution segments FERS1-FERS8 begin, respectively, at 0°, 45°, 90°, 135°, 180°, 225°, 270° and 315° (mechanical) CCW, respectively, from TDC. Since the arc-center of stator module 408A (also, service position SP1) is 15° from the 0° angle of both the mechanical and electrical reference point at TDC, service position SP1 is 15° (mechanical) (120° electrical) into full electrical revolution segment FERS1 in a CCW direction. Further, because there are eight like-size stator modules 408A-H and eight full electrical revolution segments FERS1-FERS8 in stator 408, the service positions SP1-SP8 fall at 120° (electrical) (15° mechanical) within each of full-electrical revolution segments FERS1-FERS8. Referring back to Table I, using wiring connectivity 200 of FIG. 2 wherein neutral terminal N is available to all three phases A, B, C, this means that once stator-module replacement tool 432 is located proximate the appropriate one of service positions SP1-8, only a phase B current of +I needs to be applied to stator 408 in order for the tool to be held precisely in that service position. Table III, below, illustrates the phase excitation and location information for each of service positions SP1-SP8.

TABLE III

| Service Position | Phase A current | Phase B current | Phase C current | FERS | $\theta_R^{mech}$ w/in FER (deg.) | $\theta_R^{elect}$ w/in FER (deg.) |
|---|---|---|---|---|---|---|
| SP1 | 0 | +I | 0 | FERS1 | 15 | 120 |
| SP2 | 0 | +I | 0 | FERS2 | 15 | 120 |
| SP3 | 0 | +I | 0 | FERS3 | 15 | 120 |
| SP4 | 0 | +I | 0 | FERS4 | 15 | 120 |
| SP5 | 0 | +I | 0 | FERS5 | 15 | 120 |
| SP6 | 0 | +I | 0 | FERS6 | 15 | 120 |

TABLE III-continued

| Service Position | Phase A current | Phase B current | Phase C current | FERS | $\theta_R^{mech}$ w/in FER (deg.) | $\theta_R^{elect}$ w/in FER (deg.) |
|---|---|---|---|---|---|---|
| SP7 | 0 | +I | 0 | FERS7 | 15 | 120 |
| SP8 | 0 | +I | 0 | FERS8 | 15 | 120 |

Depending on one or more factors, such as weight of each stator module 408A-H and/or whether or not rotor 404 must be moved while a stator module is located in stator-module replacement tool 432, the rotor may be outfitted, for example temporarily during maintenance procedures, with a counterweight receiver 444 to which a counterweight 448 can be added once a stator module is loaded onto the tool. In this example, counterweight 448 and counterweight receiver 444 are sized so that they balance, or fairly nearly balance, any torque applied to rotor 404 by stator-module replacement tool 432 and any stator module present in the tool so as to limit the amount of torque on the rotor.

Figure 5A:
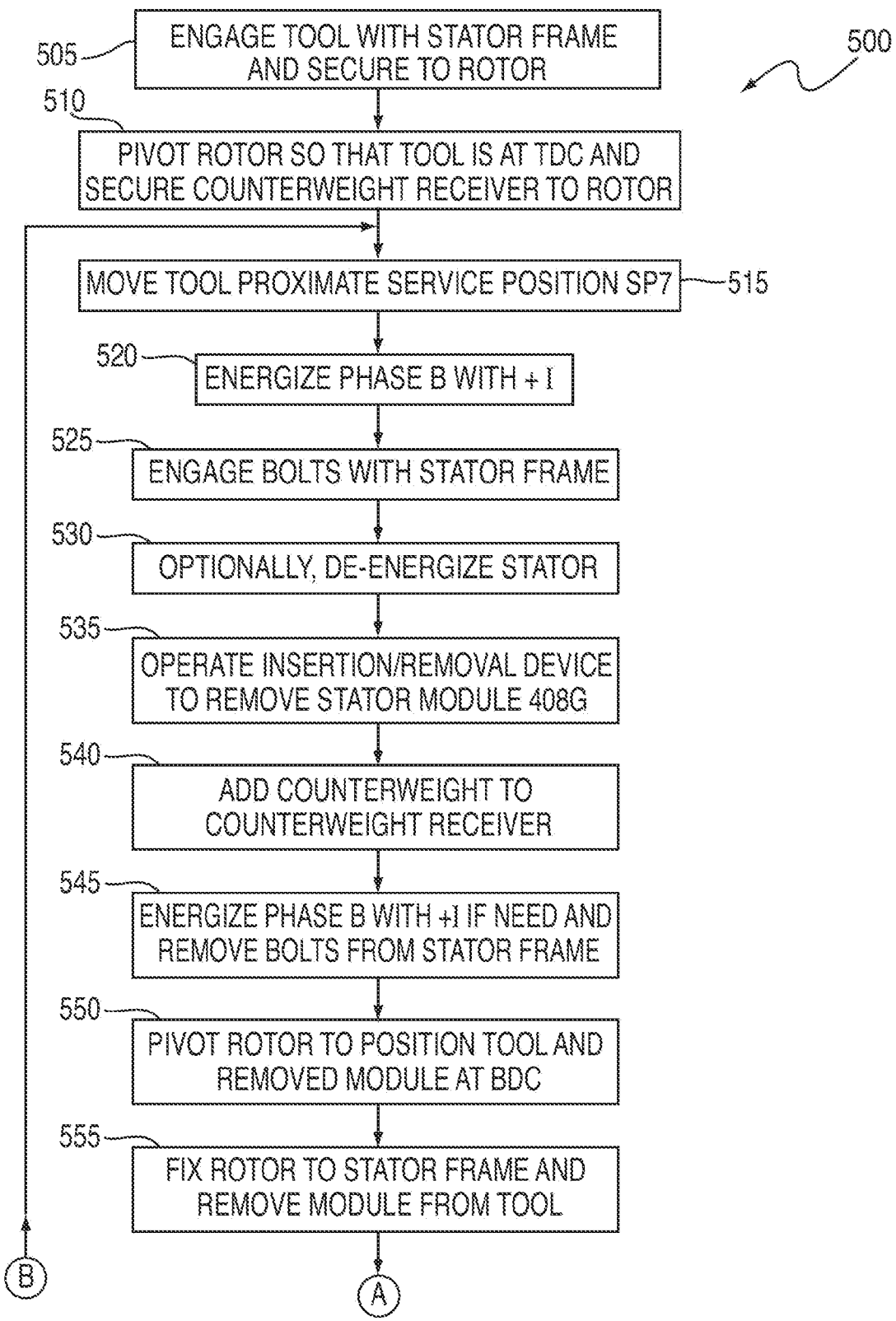
FIGS. 5A-B contain a flow diagram illustrating a procedure for replacing one of the stator modules of the machine of FIGS. 4A-B.
Figure 5B:
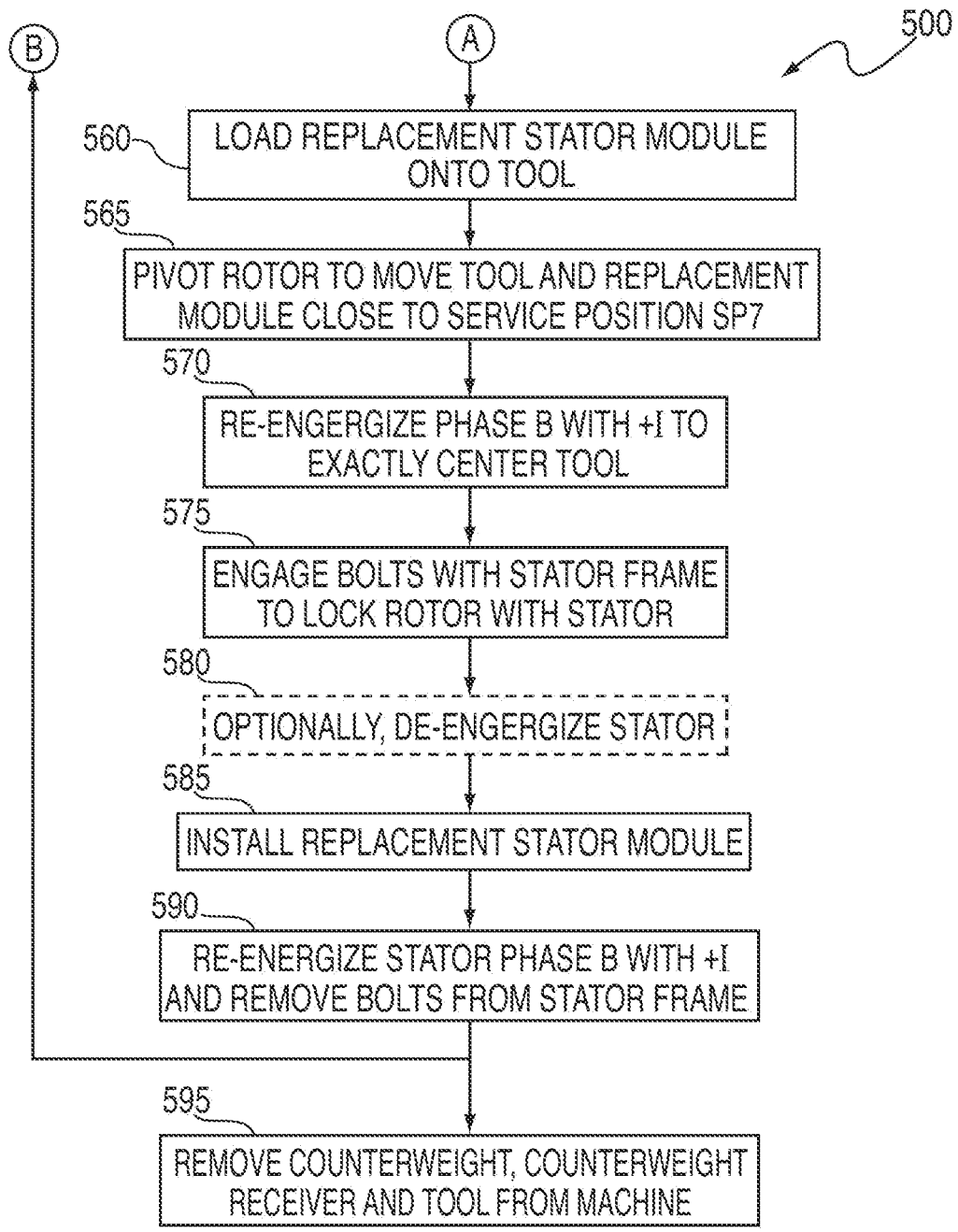

FIGS. 5A-B illustrate a procedure 500 for replacing stator module 408G (FIG. 4A) after machine 400 has been taken out of service for servicing. This example assumes that any panels (not shown) covering the portions of machine 400 to be accessed have been removed and that stator module 408G has already been identified for replacement in some manner. As will be seen, this example also assumes that stator module 408G is massive enough that it is desirable to lock rotor 404 from any movement by temporarily affixing stator-module replacement tool 432 to stator 408 at certain times during procedure 500 (the tool is already affixed to the rotor). In this example, this affixing is accomplished by temporarily bolting stator-module replacement tool 432 using bolts 452 and corresponding bolt holes 456 that are precisely located on stator frame 424 for this purpose. This example further assumes that 1) mounting of stator-module replacement tool 432, 2) mounting of counterweight receiver 444 and 3) loading and unloading of a stator module to and from the tool all occur at bottom-dead-center (BDC) 460 of machine 400. This need not be so in other embodiments.

Referring now to FIGS. 5A-B, and also to FIGS. 4A-B, at step 505 stator-module replacement tool 432 is movably engaged with stator frame 424 and is fixedly secured to rotor 404. This step will typically involve pivoting rotor 404 so that a reference one of PMs 412 is located BDC such that stator-module replacement tool 432 is secured to rotor 404 at BDC 460. This pivoting of rotor 404 may be accomplished in any number of ways, such as using a pony motor 464 attached to stator frame 424 and operatively engaged with the rotor. Alternatively, or in conjunction with operating pony motor 464 (FIG. 4B), machine 400 can be operated as a stepper motor of sorts so as to provide this gross positioning step. Manual techniques, such as using a hand crank, can also be used. Stator-module replacement tool 432 can be secured to rotor 404 using any suitable temporary fastening means, such as bolts. At step 510, rotor 404 is pivoted so that stator-module replacement tool 432 is located at TDC 440 and then counterweight receiver 444 is fixedly secured temporarily to the rotor, for example, using bolts, while the receiver is at BDC. Again, the pivoting of rotor 404 can be accomplished using any suitable means, such as pony motor 464, operating machine 400 as a stepper motor or a combination thereof, or a hand crank, among others.

After stator-module replacement tool 432 and counterweight receiver 444 have been installed, at step 515 the tool is moved to a location proximate its service position SP7, which corresponds to stator module 408G. For example, at step 515, stator-module replacement tool 432 is moved within 2° (mechanical) of service position SP7. This step can be accomplished, for example, using pony motor 464, by suitably energizing stator 408 to operate machine 400 like a stepper motor, by a combination thereof, or other suitable means. At step 520, phase B of stator 408 is energized with a positive current, +I (see Tables I and III, above), so as to precisely position stator-module replacement tool 432 at service position SP7, i.e., at 120° (electrical) within full electrical revolution segment FERS7. While excitation of phase B continues, for example, for 20 seconds or more, so that stator-module replacement tool 432 is precisely aligned with the proper ones of corresponding bolt holes 456, at step 525 bolts 452 are firmly engaged with the tool and the corresponding bolt holes to effectively lock rotor 404 to stator 408. At optional step 530, stator 408 is de-energized.

At step 535, insertion/removal device 436 is operated to remove stator module 408G and load it onto stator-module replacement tool 432. It is noted that stator module 408G can be disconnected from any connections to/on stator 408, electrical or mechanical, at this or other suitable time. It is also noted that any electrical shunting, or bypassing, of core-windings 420 aboard stator module 408G that is about to be removed can also be made at this or other suitable time. At step 540, counterweight 448 is engaged with counterweight receiver 444 so as to counteract the weight of stator module 408G just added to rotor 404. At step 545, phase B of stator 408 is again energized and bolts 452 removed.

At step 550, rotor 404 is pivoted to position stator-module replacement tool 432, and consequently removed stator module 408G, at BDC 460. At step 555, rotor 404 is fixed relative to stator 408 while removed stator module 408G is removed from stator-module replacement tool 432 and a replacement stator module (not shown) is loaded into the tool. This fixing may be accomplished, for example, by exciting phase C of stator 408 with a current −I (see Table I) while stator-module replacement tool 432 is in full electrical revolution segment FERS5 or bolting stator-module replacement tool 432 to stator frame 424 in the same manner as was done at service position SP7 when stator module 408G was removed.

At step 560, a replacement stator module (not shown) is loaded into stator-module replacement tool 432. At step 565, rotor 404 is pivoted to move stator-module replacement tool 432 back to at least close to service position SP7 using, for example, any one of the pivoting methods noted above. At step 570, phase B of stator 408 is re-energized with a positive current, +I (see Tables I and III, above), so as to precisely position stator-module replacement tool 432 at service position SP7, i.e., at 120° electrical within full electrical revolution segment FERS7. While excitation of phase B continues so that stator-module replacement tool 432 is precisely aligned with the proper ones of corresponding bolt holes 456, at step 575 bolts 452 are firmly engaged with the tool and the corresponding bolt holes to lock rotor 404 to stator 408. At optional step 580, stator 408 is de-energized. At step 585, the replacement stator module is installed into stator 408 using insertion/removal device 436 and by making any necessary connections, electrical and/or mechanical, between the new stator module and stator 408. At step 590, stator 408 is re-energized (if previously de-energized) and bolts 452 are removed to free rotor 404 from stator 408. Steps 515-590 can be repeated as necessary, or procedure 500 can proceed to step 595 wherein counterweight 448, counterweight receiver 444 and stator-module replacement tool 432 are removed from rotor 404. Of course, those skilled in the art will readily appreciate that procedure 500 just described is merely exemplary and that many variations are possible once a basic understanding of concepts of the present invention is achieved.

Figure 6:
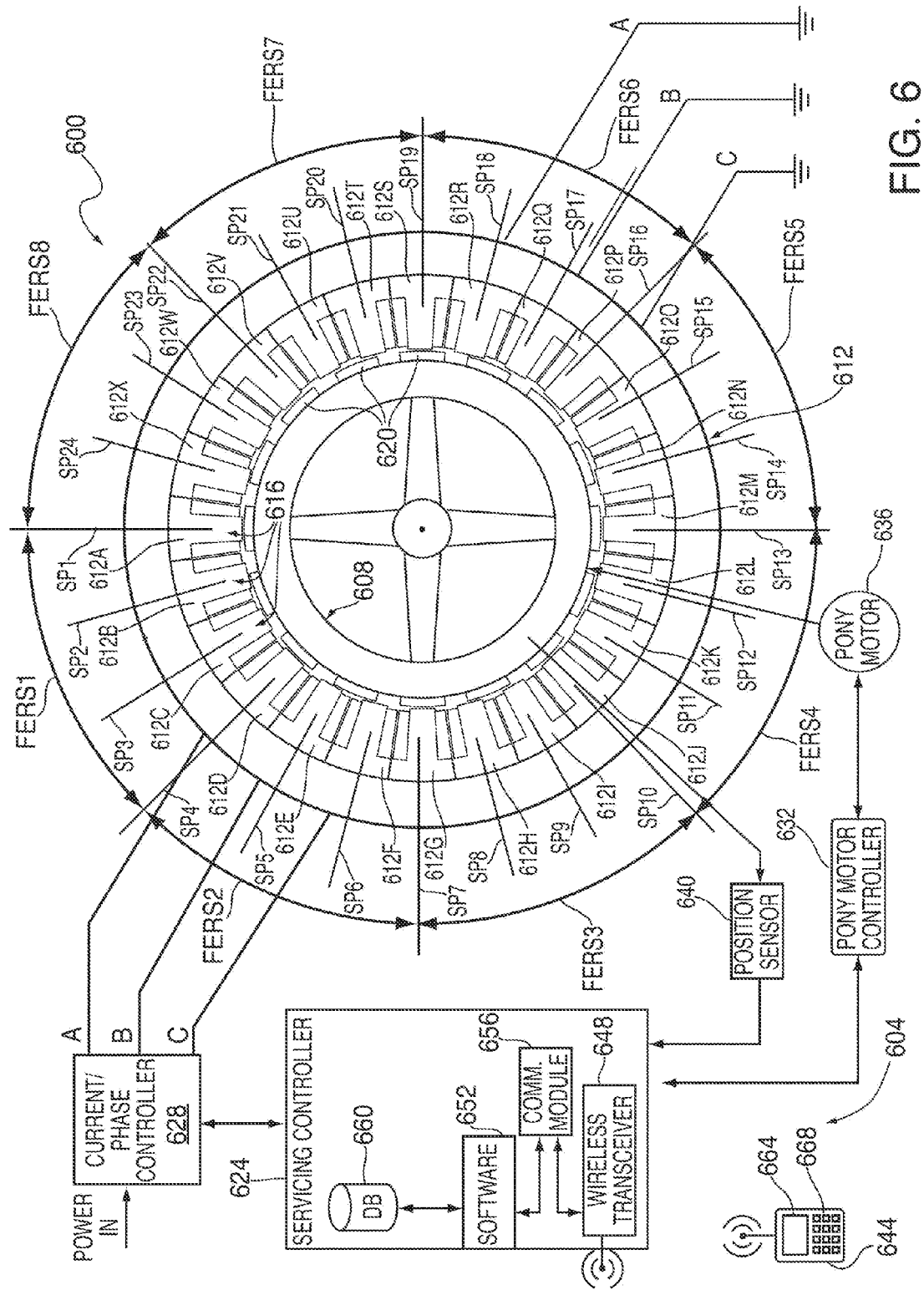
FIG. 6 is a block diagram of a system containing a machine and a servicing control system for controlling the angular position of the rotor of the machine during servicing.

FIG. 6 illustrates a machine 600 in combination with a servicing control system 604 configured to position the rotor 608 into each of a plurality of service positions, here, service positions SP1-SP24. For convenience, machine 600 is much like machine 400 of FIG. 4, except that instead of stator 612 being segmented into eight removable stator modules as in FIG. 4, stator 612 of FIG. 6 is segmented into twenty-four removable stator modules 612A-X, with each module consisting essentially or only a corresponding one of core-windings 616. Consequently, each of core-windings 616 is individually removable/replaceable in this example. The electrical and corresponding structural aspects of machine 600 are the same as machine 400. Therefore, rotor 608 has sixteen PMs 620 and stator 612 has eight full electrical revolution segments FERS1-8 based on the eight-pole nature of the stator (see FIG. 1 and corresponding explanation). With twenty-four stator modules 612A-X, there are twenty-four corresponding service positions SP1-SP24 of rotor 608, with each service position SP1-SP24 being centered on a corresponding one of stator modules 612A-X. As seen from Table I and FIG. 6, the three service positions within each of full electrical revolution segments FERS1-FERS8 are located at 0°, 15° and 30° CCW mechanical. Table IV, below, illustrates information for locating each of the twenty-four service positions of rotor 608 necessary for servicing the corresponding twenty-four stator modules 612A-X.

TABLE IV

| Service Position | Phase A current | Phase B current | Phase C current | FERS | $\theta_R^{mech}$ w/in FERS (deg.) | $\theta_R^{elect}$ w/in FERS (deg.) |
|---|---|---|---|---|---|---|
| SP1 | +I | 0 | 0 | FERS1 | 0 | 0 |
| SP2 | 0 | +I | 0 | FERS1 | 15 | 120 |
| SP3 | 0 | 0 | +I | FERS1 | 30 | 240 |
| SP4 | +I | 0 | 0 | FERS2 | 0 | 0 |
| SP5 | 0 | +I | 0 | FERS2 | 15 | 120 |
| SP6 | 0 | 0 | +I | FERS2 | 30 | 240 |
| SP7 | +I | 0 | 0 | FERS3 | 0 | 0 |
| SP8 | 0 | +I | 0 | FERS3 | 15 | 120 |
| SP9 | 0 | 0 | +I | FERS3 | 30 | 240 |
| SP10 | +I | 0 | 0 | FERS4 | 0 | 0 |
| SP11 | 0 | +I | 0 | FERS4 | 15 | 120 |
| SP12 | 0 | 0 | +I | FERS4 | 30 | 240 |
| SP13 | +I | 0 | 0 | FERS5 | 0 | 0 |
| SP14 | 0 | +I | 0 | FERS5 | 15 | 120 |
| SP15 | 0 | 0 | +I | FERS5 | 30 | 240 |
| SP16 | +I | 0 | 0 | FERS6 | 0 | 0 |
| SP17 | 0 | +I | 0 | FERS6 | 15 | 120 |
| SP18 | 0 | 0 | +I | FERS6 | 30 | 240 |
| SP19 | +I | 0 | 0 | FERS7 | 0 | 0 |
| SP20 | 0 | +I | 0 | FERS7 | 15 | 120 |
| SP21 | 0 | 0 | +I | FERS7 | 30 | 240 |
| SP22 | +I | 0 | 0 | FERS8 | 0 | 0 |
| SP23 | 0 | +I | 0 | FERS8 | 15 | 120 |
| SP24 | 0 | 0 | +I | FERS8 | 30 | 240 |

In this example, servicing control system 604 includes a servicing controller 624, a current/phase controller 628, a pony-motor controller 632 for controlling a pony motor 636, a rotor position sensor 640 and a wireless user-interface device 644. Servicing controller 624 includes a wireless transceiver 648 for communicating wirelessly with wireless user-interface device 644, software 652 for controlling primary functionalities of servicing control system 604, a communications module 656 for enabling communications between software 652 and the wireless user-interface device 644, and a database 660 containing information needed for the servicing control system to perform the desired functions, such as position information contained in Table IV, above. Each of the components of servicing control system 604 is described below in more detail in the context of a specific example.

Servicing control system 604 provides an automated system for positioning rotor 608 at any one of its twenty-four service positions SP1-24 for the purpose of removing/installing/replacing any one of twenty-four stator modules 612A-X using a stator-module servicing tool (not shown), such as stator-module replacement tool 432 of FIG. 4, for example. By "automated" in this example it is meant primarily that all a user needs to do is input or select a currently desired one of service positions SP1-SP24 into servicing control system 604 and request that the control system position rotor 608 into that position. In this example, a user can perform both of these steps using wireless user-interface device 644, which may be any suitable dedicated or general-purpose mobile, portable or non-portable wireless device, as will be readily understood by those skilled in the art. Wireless user-interface device 644 can include a display 664, which the device may use to display a graphical user interface (not shown), and input means, such as a keyboard 668, touchscreen display, a combination of these two, or any other suitable input mean. Of course, alternative embodiments can implement hardwired user-interface schemes, if desired.

When the user inputs, for example, via wireless user-interface device 644, a desired service position, say service position SP18, and requests servicing control system 604 to position rotor 608 at the selected service position, the wireless user-interface device transmits the corresponding data/information to wireless transceiver 648, which in turn communicates the data/information to communications module 656. Communications module 656 then communicates the data/information to software 652, which then uses the data/information to execute the request. Assuming that the relevant point on rotor 608 is not already at or close to service position SP18, software 652 determines the current angular position of the rotor using data from rotor position sensor 640. Software 652 also uses positional information stored in database 660, such as the fact that service position SP18 is located at 30° (mechanical) within full electrical revolution segment FERS6, to determine how to control pony motor 636 to move the relevant point on rotor 608 from its current position to a position proximate service position SP18 so as to grossly position the rotor. Using that information and continual rotor-position data from rotor-position sensor 640, software 652 sends an appropriate signal to pony-motor controller 632 that causes pony motor 636 to move rotor 608 so as to rotate the relevant point on the rotor to a position proximate service position SP18.

When software 652 recognizes rotor 608 is suitably positioned from the rotor position data from rotor-position sensor 640, it retrieves information from database 660 regarding how to energize stator 612 so that the rotor is firmly held in service position SP18 by the energized stator. As seen in Table IV, service position SP18 is located at 240° electrical within full electrical revolution segment FERS7, which is achieved by exciting only phase C with +I. Consequently, servicing controller 624 sends a suitable signal to current/phase controller 628 that causes the current/phase controller to output 0 on phases A and B and +I on phase C. In this example, current/phase controller 628 continues this output until the user inputs another command requesting servicing control system 604 to stop holding rotor 608 at the desired service position, here, service position SP18.

Those skilled in the art will readily appreciate that the forgoing example is merely illustrative of but one of many configurations of a servicing control system that can be made to implement servicing procedures of the present disclosure. Of course, numerous changes can be made to one or more aspects of the explicitly disclosed system. In some alternative embodiments, the system need not be as automated as in the foregoing example. For example, pony motor 636 and rotor-position sensor 640 can be eliminated and gross positioning of rotor 608 may be accomplished manually, such as by using a hand crank, come-along, or other manual means. In other alternative embodiments, the gross positioning may be accomplished by suitably energizing stator 612 to cause rotor 608 to rotate proximate to the desired service position. In those embodiments, servicing controller 624 can suitably control current/phase controller 628 to output the necessary currents on, for example, phases A-C. In still further embodiments, pony motor 636 can be controlled to assist such stator-assisted gross positioning. As can be appreciated, these are but a few of the variety of alternatives that can be implemented.

Figure 7:
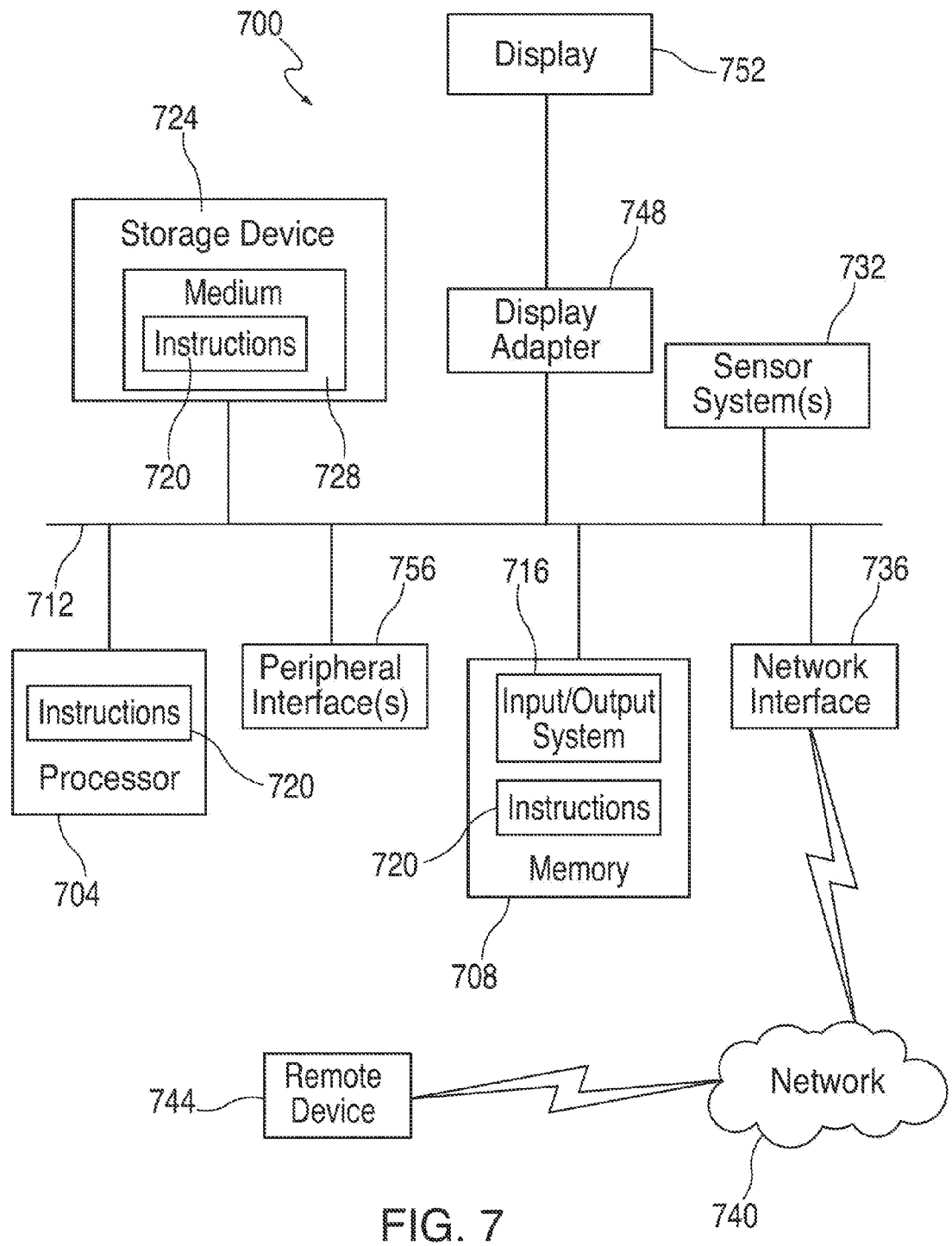
FIG. 7 is a block diagram of a system controller for implementing aspects of a servicing control system of the present disclosure.

Referring now to FIG. 7, and also to FIG. 6, FIG. 7 illustrates an example of a machine/computing device, or "system controller" 700, that can be used to implement a set of instructions for causing a servicing control system, such as servicing control system 604 of FIG. 6, to perform any one or more of the aspects, functionalities and/or methodologies of the present disclosure. System controller 700 includes a processor 704 and a memory 708 that communicate with each other, and with other components, such as current/phase controller 628, rotor-position sensor 640, pony motor 636, etc., via a bus 712. Bus 712 may include any of several types of communication structures including, but not limited to, a memory bus, a memory controller, a peripheral bus, a local bus, and any combinations thereof, using any of a variety of architectures.

Memory 708 may include various components (e.g., machine readable media) including, but not limited to, a random access memory component (e.g, a static RAM "SRAM", a dynamic RAM "DRAM", etc.), a read only component, and any combinations thereof. In one example, a basic input/output system 716 (BIOS), including basic routines that help to transfer information between elements within system controller 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

System controller 700 may also include a storage device 724. Examples of a storage device (e.g., storage device 724) include, but are not limited to, a hard disk drive for reading from and/or writing to a hard disk, a magnetic disk drive for reading from and/or writing to a removable magnetic disk, an optical disk drive for reading from and/or writing to an optical media (e.g., a CD, a DVD, etc.), a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1395 (FIREWIRE), and any combinations thereof. In one example, storage device 724 may be removably interfaced with system controller 700 (e.g., via an external port connector (not shown)). Particularly, storage device 724 and an associated machine-readable storage medium 728 may provide nonvolatile and/or volatile storage of machine-readable instructions, data structures, program modules, and/or other data for system controller 700. In one example, instructions 720 may reside, completely or partially, within machine-readable storage medium 728. In another example, instructions 720 may reside, completely or partially, within processor 704. In yet other embodiments, instructions 720 may be provided to system controller 700 via a machine-readable signal medium (not shown).

System controller 700 may also include connections to one or more sensors 732, such as rotor-position sensor 640 for sensing the rotational position of rotor 608, among other things. Such sensor system(s) 732, including any analog-to-digital converters that may be needed, can be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Alternatively, in one example, a user of system controller 700 may enter commands and/or other information into the controller via an input device, such as wireless user-interface device 644 of FIG. 6, and/or another input device, such as an alphanumeric input device (e.g., a keyboard), a pointing device, a joystick, a gamepad, an audio input device (e.g., a microphone, a voice response system, etc.), a cursor control device (e.g., a mouse), a touchpad, an optical scanner, touchscreen, and any combinations thereof.

A user may also input commands and/or other information to system controller 700 via storage device 724 (e.g., a removable disk drive, a flash drive, etc.) and/or a network interface device 736. A network interface device, such as network interface device 736 may be utilized for connecting system controller 700 to one or more of a variety of networks, such as network 740, and one or more remote devices 744 connected thereto. Examples of a network interface device include, but are not limited to, a network interface card, a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a direct connection between two computing devices, and any combinations thereof. A network, such as network 740, may employ a wired and/or a wireless mode of communication. In general, any network topology may be used. Information (e.g., data, software 720, etc.) may be communicated to and/or from system controller 700 via network interface device 744.

System controller 700 may further include a video display adapter 748 for communicating a displayable image to a display device 752. Examples of a display device include, but are not limited to, a liquid crystal display (LCD), a cathode ray tube (CRT), a plasma display, and any combinations thereof. In addition to display device 752, system controller 700 may include a connection to components of servicing control system 604, such as current/phase controller 628, rotor-position sensor 640, pony motor 636, etc., via one or more other peripheral output interface(s) 756. Examples of a peripheral interface include, but are not limited to, a serial port, a USB connection, a FIREWIRE connection, a parallel connection, a wireless connection, and any combinations thereof.

Figure 8:
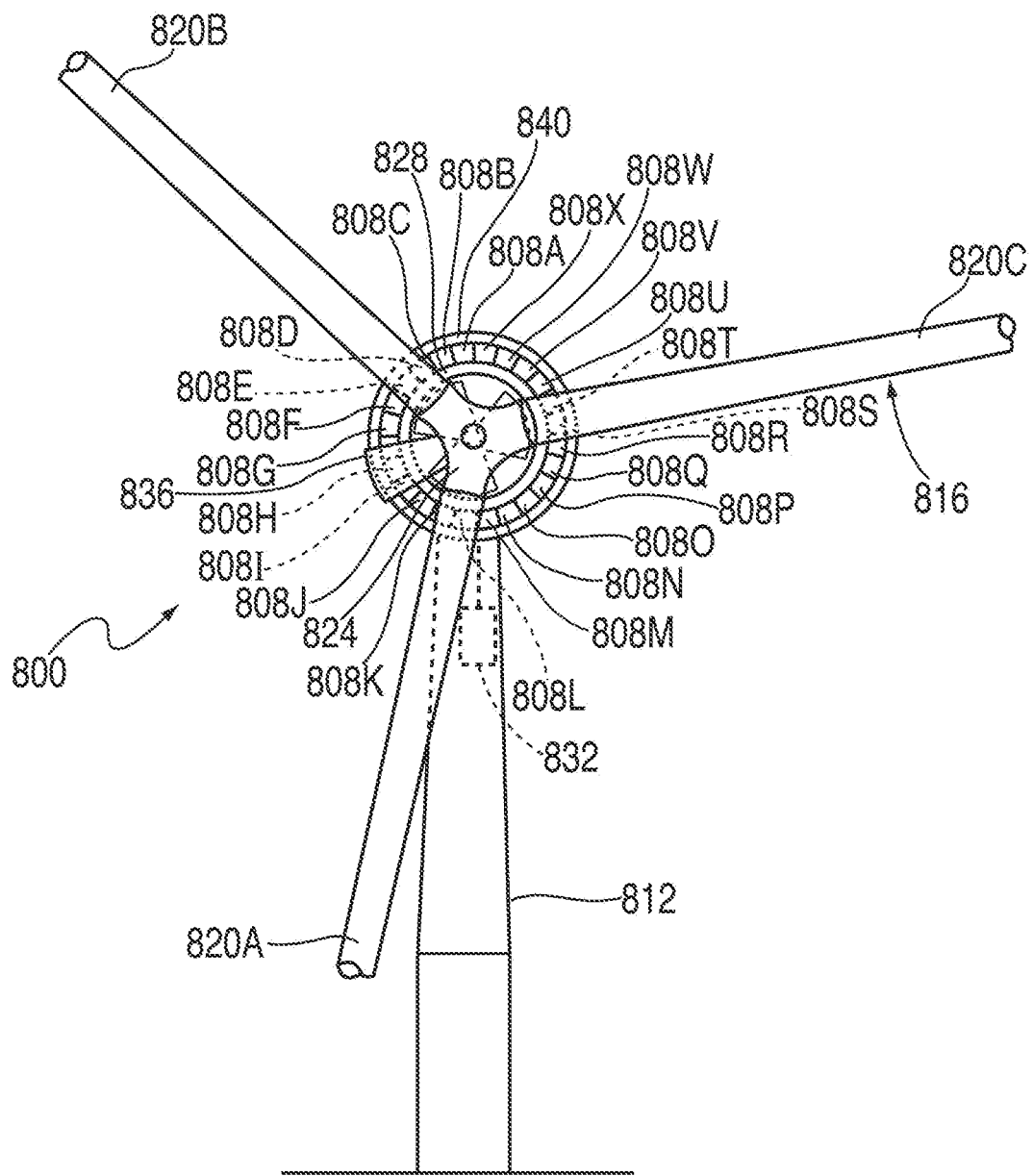
FIG. 8 is a front elevational view of a wind power unit (WPU) that includes an electrical power generator and servicing control system that are similar to, respectively, the machine and servicing control system of FIG. 6 and has a stator-module replacement tool movably mounted to the stator frame of the generator.

FIGS. 8-11 illustrate several implementations of the systems and procedures presented above, in the context of wind power units (WPUs), which can have large electrical power generators that can benefit from the disclosed systems and procedures. Referring first to FIG. 8, this figure illustrates a large (e.g., 1 MW or larger) WPU 800. In this example, WPU 800 is a direct-drive unit that includes a large-diameter (e.g., 4 m or greater) PM-type generator 804 that is generally configured like machines 100, 400, 600 above, but with more PMs (not shown) and more core-windings (not shown). Consequently, the electrical characteristics of generator 804 are different from machines 100, 400, 600. In addition, the number and locations of the stator modules (here modules 808A-X) in generator 804 can be different from the number of stator modules 408A-H, 612A-X shown in FIGS. 4A and 6, respectively. Consequently, the number and/or location of corresponding service positions of the rotor of generator 804 may likewise be different. As is well known, other components of WPU 800 include a support tower 812 and a wind turbine 816 that includes a plurality of blades, here three blades 820A-C, secured to a central hub 824 that is directly attached to the rotor 828 of generator 804.

Despite the differences between generator 804 and machines 100, 400, 600, above, WPU 800 includes a servicing control system 832 that is largely the same as servicing control system 604 of FIG. 6, except primarily for the differences in positional information data stored therein due to physical and/or electrical differences between generator 804 and machine 600 mentioned above. (It is noted that while servicing control system 832 is shown schematically in FIG. 8, in some embodiments, the control system can simply be included in the control equipment provided for controlling the operation of WPU 800.) Even though differences may exist, those skilled in the art will readily appreciate how to locate stator modules 808A-X of generator 804, how to determine the necessary service positions for those stator modules and how to design servicing control system 832 to control the generator by energizing its stator to control the position of the rotor in connection with removing, installing and/or replacing ones of the stator modules in a manner consistent with the systems and procedures described above relative to FIGS. 1-7. In one example, a stator-module replacement tool 836 moveably engaged with stator frame 840 of generator 804 and affixed to rotor 824 in the manner of stator-module replacement tool 432 of FIG. 4 can be used for inserting and/or removing ones of the stator modules of generator 804. Consequently, a same or similar procedure similar to procedure 500 described above relative to FIG. 5 can be implemented in replacing any of the stator modules of generator 804.

Figure 9:
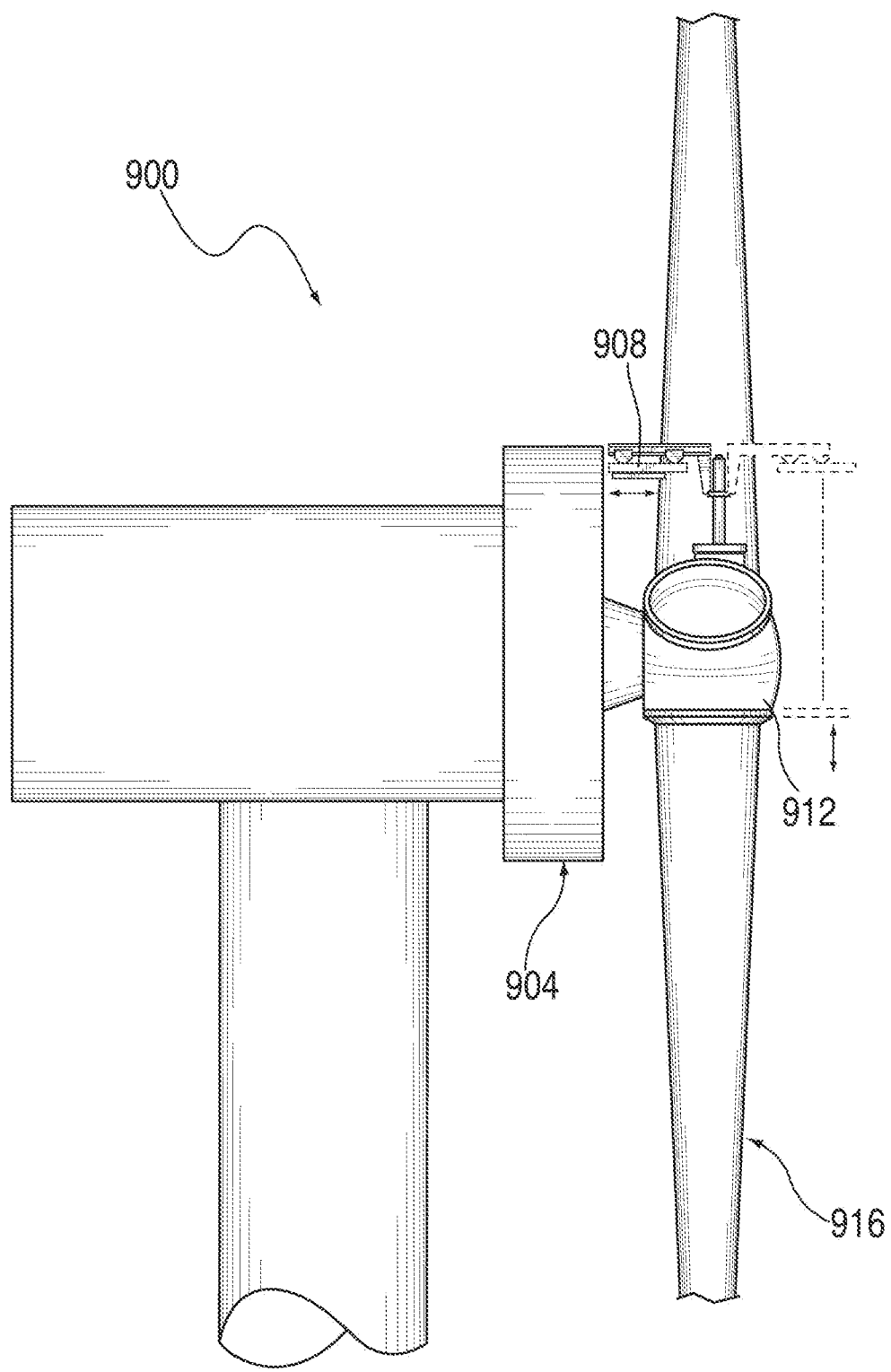
FIG. 9 is a side elevational view of a WPU that includes an electrical power generator and servicing control system that are similar to, respectively, the machine and servicing control system of FIG. 6 and has a stator-module replacement tool mounted to the hub of the wind turbine.

FIG. 9 illustrates a WPU 900 that is virtually identical to WPU 800 of FIG. 8, except that instead of the stator-module replacement tool being mounted directly to the rotor and stator frame of generator 904, in FIG. 9 the stator-module replacement tool 908 is mounted to the hub 912 of the wind turbine 916 that is coupled to the rotor of the generator. Because WPU 900 is a direct-drive unit, hub 912 rotates in unison with the rotor of generator 904 so that the same effect can be achieved with implementing, in WPU 900, the systems and procedures described relative to FIGS. 1-7 as is achieved in implementing those systems and procedures in WPU 800 of FIG. 8. Further information regarding the physical configuration of WPU 900 and hub-mounted stator-module replacement tool 908 can be found in FIG. 6 and corresponding explanation of U.S. patent application Ser. No. 13/240,756, titled "METHOD AND SYSTEM FOR SERVICING A HORIZONTAL-AXIS WIND POWER UNIT" and filed on the same date as the present application, which is incorporated herein by reference for its pertinent teachings. Further information regarding how WPU 900 can be controlled for servicing the stator modules of generator 904 can readily be learned from FIGS. 1-7 of the present disclosure and the corresponding foregoing explanations.

Whereas FIGS. 1-9 are directed to positioning a certain point on a rotor of a machine relative to one or more points fixed relative to the stator of the machine (in the foregoing examples, the various service positions of stator modules 408A-H, 612A-X (FIGS. 4 and 6, respectively)), in alternative embodiments it may be desirable to position one or more service positions on a rotor relative to one or more points fixed relative to the stator. For example, in the context of machine 100 of FIG. 1 above, a PM replacement tool (not shown) may be used to insert, remove and/or replace one or more of PMs 116A-P. If the PM replacement tool is fixed relative to stator 108, say at TDC, in this case each of the sixteen locations of PMs 116A-P becomes a service position relative to the fixed PM replacement tool. This is illustrated in FIG. 10 with machine 1000.

Figure 10:
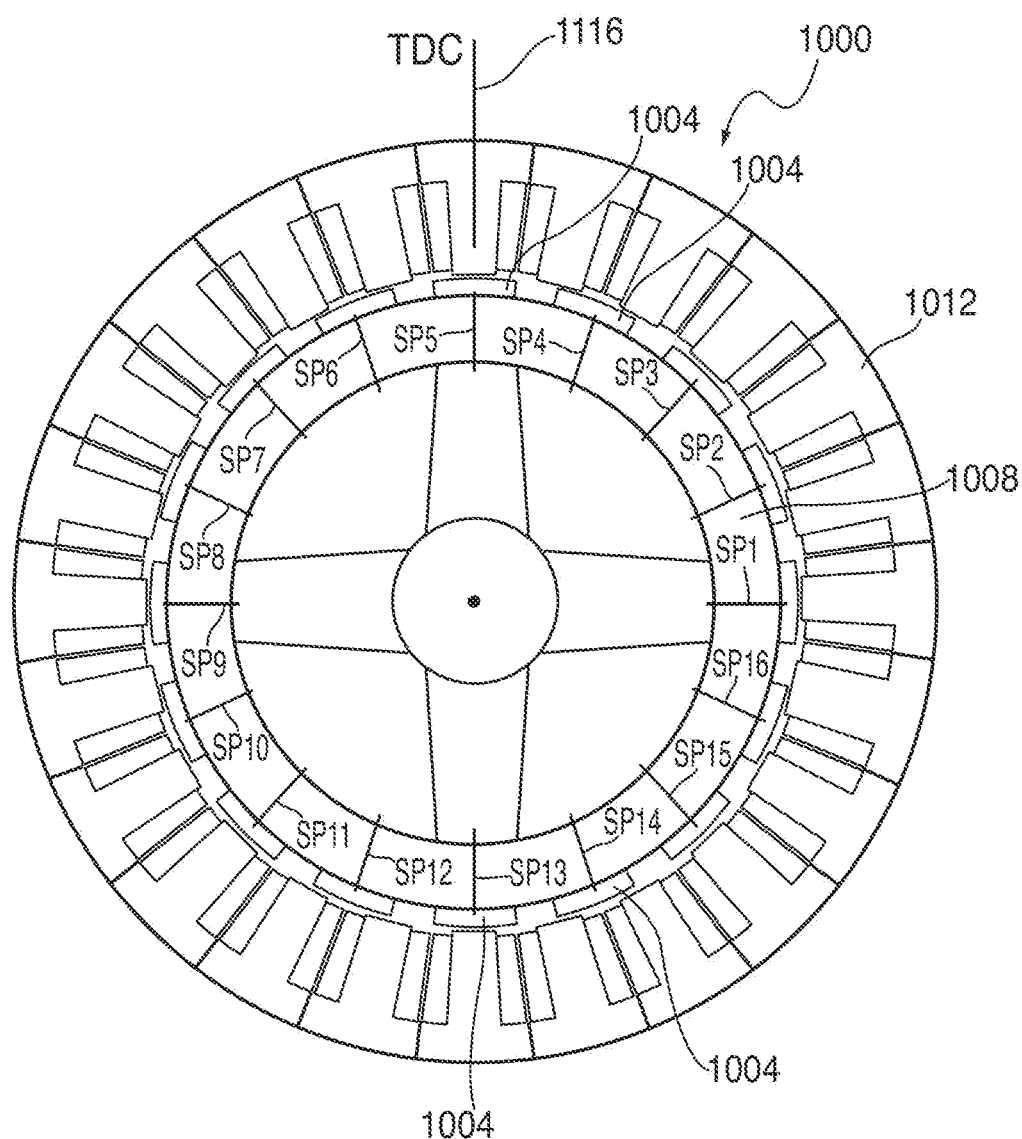
FIG. 10 is a front elevational view of a machine having a rotor and a stator, illustrating a method of precisely positioning, in seriatim, multiple points on the rotor relative to a fixed location on the stator.

Referring now to FIG. 10, it is seen that machine 1000 is identical to machine 100 of FIG. 1. Machine 1000 of FIG. 10 is, for convenience, also nearly identical to machines 400, 600 of FIGS. 4A and 6, respectively. The only important difference between FIG. 10 and each of FIGS. 4A and 6 is that in FIG. 10 the service positions SP1-SP16 correspond respectively to the sixteen locations of PMs 1004, whereas in FIG. 4A service positions SP1-SP8 correspond respectively to stator modules 408A-H and in FIG. 6 service positions SP1-SP24 correspond respectively to stator modules 612A-X. Consequently, in the case of FIG. 10, service positions SP1-SP16 are relative to rotor 1008, rather than stator 1012. Other than that, the basic concepts of controllably positioning a rotor relative to a stator of a machine as described above relative to FIGS. 1-7 are applicable and/or adaptable to positioning, in this example, each of PMs 1004 (i.e., each of service positions SP1-SP16) at the TDC 1116 location required for servicing the PMs. It is recognized that due to the particular arrangement of PMs 1004 and the phasing of stator 1012 that the currents applied to the stator may be more complex than the examples provided above relative to FIGS. 1-6. However, the additional complexity should not be outside the level of ordinary skill in the art.

Figure 11:
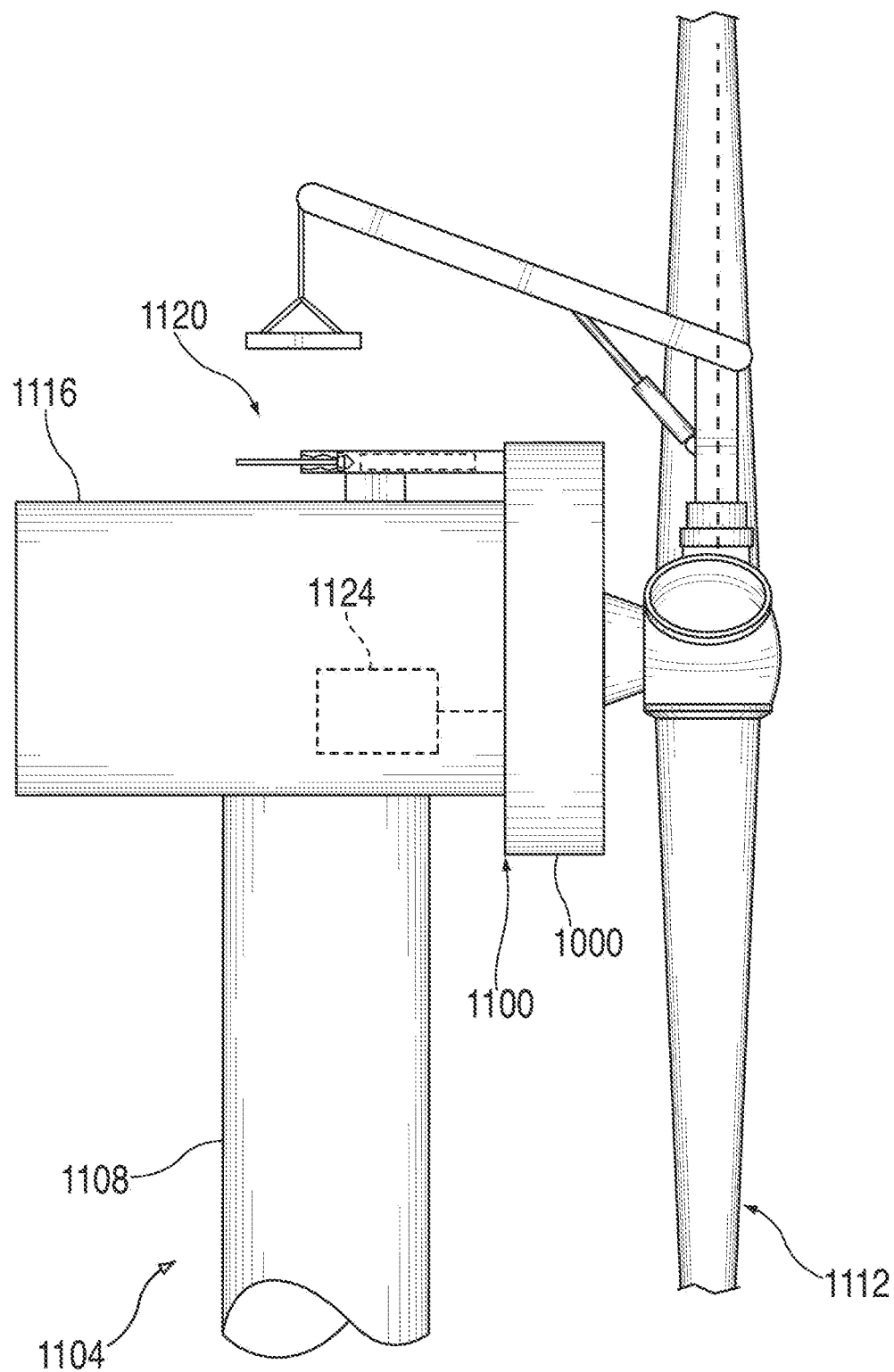
FIG. 11 is a side elevational view of a WPU having a PM replacement tool mounted to the nacelle of the WPU.

FIG. 11 illustrates an example setting for machine 1000 and the PM removal concept mentioned in conjunction therewith. As seen in FIG. 11, machine 1000 is implemented primarily as an electrical power generator 1100 of a WPU 1104, that also includes a support tower 1108, a wind turbine 1112 and a nacelle 1116. During servicing of generator 1100 that requires removal or replacement of one or more PMs 1004 (FIG. 10) of the generator, a PM replacement tool 1120 is fixedly secured to nacelle 1116. For details of a PM replacement tool suitable for use as PM replacement tool 1120, the reader is referred to U.S. patent application Ser. No. 13/240,756, titled "METHOD AND SYSTEM FOR SERVICING A HORIZONTAL-AXIS WIND POWER UNIT," mentioned above, and U.S. patent application Ser. No. 12/543,153, titled "METHOD AND APPARATUS FOR PERMANENT MAGNET ATTACHMENT IN AN ELECTROMECHANICAL MACHINE" filed on Aug. 18, 2009, each of which is incorporated by reference herein for its teachings on the subject. As can be readily appreciated by those skilled in the art, when a particular one of PMs 1004 (FIG. 10) of generator 1100 needs servicing, a user could use a servicing control system 1124 similar to servicing control system 604 of FIG. 6 to command the system to position that PM (and, consequently, the corresponding service position) precisely at TDC where PM replacement tool 1120 is located. At that point, it may be desirable to secure rotor 1008 (FIG. 10) to PM replacement tool 1120 while the tool is being operated. When servicing of the particular one of PMs 1004 (FIG. 10) is done, PM replacement tool 1120 may be unfastened from rotor 1008 (FIG. 10) if previously fastened, and further servicing or other work can be performed.

It is noted that while the foregoing examples involve replacement tools for inserting and removing stator modules and PMs from, respectively, stators and rotors, those skilled in the art will readily appreciate that there may be other tools and other service devices that can be used for servicing various components or parts of the corresponding machine. Consequently, the present disclosure should be read more broadly than encompassing only stator-module and PM replacement tools.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of servicing a machine having a stator and a rotor that includes a rotational axis, the method comprising:
    providing a service device operatively configured for servicing the machine, wherein the rotor of the machine has a service position associated with the service device;
    energizing the machine so as to position and maintain the rotor in the service position about the rotational axis; and
    when the rotor is in the service position as a result of said energizing, servicing the machine using the service device;
    wherein said providing the service device includes fixedly engaging the rotor of the machine with the service device so that the entirety of the service device is angularly fixed relative to the rotor and pivotable about the rotational axis of the rotor in response to movement of the rotor about the rotational axis,
    wherein:
       the machine has a stator and said providing the service device includes providing a stator servicing device;
       the stator comprises a plurality of replaceable stator modules and said providing the stator servicing device includes providing a stator module installation/removal tool configured for installing and removing ones of the plurality of replaceable stator modules;
       the method further comprises, prior to said energizing, rotating the rotor to a position proximate the service position, wherein said rotating the rotor includes exciting the stator in a manner that rotates the rotor to the position proximate the service position.

2. A method according to claim 1, wherein the machine is a component of a wind power unit having a hub and said providing the service device includes attaching the service device to the hub.

3. A method according to claim 1, wherein said engaging the rotor of the machine includes mechanically coupling the service device to the rotor.

4. A method according to claim 1, wherein said servicing the machine includes replacing one of the plurality of replaceable stator modules using the stator module installation/removal tool.

5. A method according to claim 1, wherein the stator has a stator frame supporting the plurality of replaceable stator modules and the method further includes, before said servicing and after said energizing, temporarily securing the installation/removal tool to the stator frame, and, after said servicing, un-securing the installation/removal tool from the stator frame.

6. A method according to claim 1, wherein the plurality of replaceable stator modules has a plurality of corresponding respective required replacement tool positions and said energizing includes exciting the stator so that the service position corresponds to one of the plurality of required replacement tool positions.

7. A method according to claim 1, wherein said rotating the rotor includes rotating the rotor to within 2 mechanical degrees of the service position.

8. A method according to claim 1 wherein the machine is an electrical power generator of a wind power unit.

9. A method of servicing a machine having a stator and a rotor that includes a rotational axis, the method comprising:
    providing a service device operatively configured for servicing the machine, wherein the rotor of the machine has a service position associated with the service device;
    energizing the machine so as to position and maintain the rotor in the service position about the rotational axis; and
    when the rotor is in the service position as a result of said energizing, servicing the machine using the service device;
    wherein:
       said providing the service device includes fixedly engaging the rotor of the machine with the service device so that the entirety of the service device is angularly fixed relative to the rotor and pivotable about the rotational axis of the rotor in response to movement of the rotor about the rotational axis;
       the machine has a stator and said providing the service device includes providing a stator servicing device;
       the stator comprises a plurality of replaceable stator modules and said providing the stator servicing device includes providing a stator module installation/removal tool configured for installing and removing ones of the plurality of replaceable stator modules; and
       the plurality of replaceable stator modules has a plurality of corresponding respective required replacement tool positions and said energizing includes exciting the stator so that the service position corresponds to one of the plurality of required replacement tool positions.

10. A method according to claim 9, wherein the machine is a component of a wind power unit having a hub and said providing the service device includes attaching the service device to the hub.

11. A method according to claim 9, wherein said engaging the rotor of the machine includes mechanically coupling the service device to the rotor.

12. A method according to claim 9, wherein said servicing the machine includes replacing one of the plurality of replaceable stator modules using the stator module installation/removal tool.

13. A method according to claim 9, further comprising, prior to said energizing, rotating the rotor to a position proximate the service position.

14. A method according to claim 13, wherein said rotating the rotor includes exciting the stator in a manner that rotates the rotor to the position proximate the service position.

15. A method according to claim 13, wherein said rotating the rotor to the position proximate the service position includes using a pony motor.

16. A method according to claim 13, wherein said rotating the rotor includes rotating the rotor to within 2 mechanical degrees of the service position.

17. A method according to claim 13, wherein said rotating the rotor includes energizing the machine in a manner that rotates the rotor to the position proximate the service position.

18. A method according to claim 9, wherein the stator has a stator frame supporting the plurality of replaceable stator modules and the method further includes, before said servicing and after said energizing, temporarily securing the installation/removal tool to the stator frame, and, after said servicing, un-securing the installation/removal tool from the stator frame.

19. A method according to claim 9, wherein the machine is an electrical power generator of a wind power unit.

* * * * *